United States Patent
Cho (10) Patent No.: US 8,065,063 B2
(45) Date of Patent: Nov. 22, 2011

(54) METHOD AND APPARATUS TO SHIFT-BY-SPEECH FOR SEMI-MANUAL TRANSMISSIONS WITH INTELLIGENT SHIFTING ALGORITHM

(76) Inventor: Samuel Seungmin Cho, Fremont, CA (US)

( * ) Notice: Subject to any disclaimer, the term of this patent is extended or adjusted under 35 U.S.C. 154(b) by 854 days.

(21) Appl. No.: 12/124,175

(22) Filed: May 21, 2008

(65) Prior Publication Data

US 2008/0294317 A1    Nov. 27, 2008

Related U.S. Application Data

(60) Provisional application No. 60/924,606, filed on May 22, 2007.

(51) Int. Cl.
*G06F 7/00* (2006.01)

(52) U.S. Cl. ............... 701/51; 701/52; 477/70; 477/79; 477/125

(58) Field of Classification Search .................. 701/51; 74/335, 339, 359, 437.11; 477/64, 70, 79, 477/108, 121, 365
See application file for complete search history.

(56) References Cited

U.S. PATENT DOCUMENTS

| | | | |
|---|---|---|---|
| 4,862,363 A | 8/1989 | Krisher et al. | |
| 6,487,484 B1 * | 11/2002 | Shober et al. | 74/335 |
| 6,778,895 B1 | 8/2004 | Schwab et al. | |
| 7,926,374 B2 | 4/2011 | Strait et al. | |
| 7,962,268 B2 | 6/2011 | Cho | |
| 2002/0128762 A1 * | 9/2002 | Noguchi et al. | 701/51 |

\* cited by examiner

*Primary Examiner* — Thomas Black
*Assistant Examiner* — Luke Huynh
(74) *Attorney, Agent, or Firm* — Samuel S. Cho (57) ABSTRACT

A shift-by-speech transmission system with intelligent shifting algorithm allows a driver or a motorcyclist to choose a desired gear by voice command. An intuitive and engaging shift-by-speech technology disclosed in the present invention, called "VoiceShift", allows the driver or the motorcyclist to switch gears by voice commands. VoiceShift also allows the driver or the motorcyclist to skip-shift gears in non-sequential manner, thereby giving the driver a sense of freedom and excitement similar to a stick-shift manual transmission vehicle. A novel intelligent shifting algorithm of the shift-by-speech transmission system is capable of auto-correcting the driver's judgment error in skip-shifting by engaging a closest mechanically-safe gear to the driver's desired gear issued via voice command.

20 Claims, 8 Drawing Sheets

METHOD AND APPARATUS TO SHIFT-BY-SPEECH FOR SEMI-MANUAL TRANSMISSIONS WITH INTELLIGENT SHIFTING ALGORITHM

RELATED APPLICATIONS

The present invention claims priority to a U.S. provisional application 60/924,606 filed on May 22, 2007. The present invention is also related to a U.S. non-provisional application Ser. No. 12/124,021 filed on May 20, 2008, which claimed priority to another U.S. provisional application 60/924,573, filed on May 21, 2007.

BACKGROUND

This invention generally relates to automobiles and/or motorcycles. In particular, the invention relates to a novel method and apparatus to provide driver-oriented and intuitive manual-mode transmission gearshifts in a variety of automobile transmissions.

Semi-manual transmissions, defined herein as including automatic, auto-clutch manual, or CVT transmissions with manual gear selection modes, are popular among modern automobiles today. Many auto manufacturers, including BMW, Mercedes-Benz, Toyota, Honda, Nissan, GM, and Hyundai provide semi-manual transmission gearboxes which enable drivers to choose a desired gear sequentially using a gearshift lever and/or a paddle shifter. Examples of semi-manual transmission gearboxes are "SportShift," "Tiptronic," "Sequential Manual Gearbox" (SMG), and "Direct Shift Gearbox" (DSG). SportShift and Tiptronic gearboxes are generally considered automatic transmissions with manual shift modes. SMG and DSG, on the other hand, are generally considered automated manual transmission gearboxes which provide computer-controlled clutching for rapid automated shifts.

The semi-manual transmission gearboxes generally operate sequentially. If a driver wants to double-downshift, the driver typically has to tap a gearshift lever twice or tap a paddle shifter twice to select a desired double-downshifted gear. Many auto enthusiasts believe that semi-manual transmissions reduce driving enjoyment by removing a driver's direct, mechanical linkage to an automobiles transmission system which is enabled by a physical manual clutch pedal and a manual "stick" shifter.

Although newer variants of semi-manual transmissions, such as SMG and DSG, significantly reduced the shifting delay caused by a driver's manual sequential gear selection compared to earlier semi-manual transmission gearboxes based on automatic transmissions, many drivers still complain that the lack of direct connection to the car achieved by a clutch pedal and a manual transmission box results in a less engaged and sometimes "less fun" driving experience. Furthermore, although the actual shifting of gears is provided electronically (shift-by-wire) on most semi-manual transmissions, a driver in the manual-shifting mode is still distracted by his/her requirement to operate a gearshift lever and/or a paddle shifter. Moreover, many critics of the existing semi-manual transmission setups also suggest that paddle shifters, which are often located behind a car's steering wheel, are difficult to operate on curvy roads when the steering wheel is turned substantially clockwise or counterclockwise from its straight-path position.

Therefore, a more intuitive and engaging approach to provide a semi-manual shift mode is desired for today's automobile drivers and motorcyclists.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

A shift-by-speech transmission system is configured to select a gear indicated by a driver's voice command for a vehicle. The shift-by-speech transmission system comprises a microphone configured to pick up the driver's voice command, a voice recognition program configured to analyze the driver's voice command for a driver's particular gear selection, wherein the voice recognition program generates an output signal indicating the driver's particular gear selection if the driver's voice command is successfully understood, a shift-by-speech transmission control system containing a manual-shifting mode control logic block operatively connected to a transmission gearbox, wherein the output signal of the voice recognition program to the shift-by-speech transmission control system enables choosing the driver's particular gear selection or a mechanically-safer gear for the transmission gearbox, a transmission and/or engine protection logic operatively connected to the shift-by-speech transmission control system, wherein the transmission and engine protection logic is configured to determine whether the driver's particular gear selection causes a mechanically-detrimental condition to the shift-by-speech transmission system, to an engine, or to other parts of the vehicle, and an intelligent shifting algorithm logic configured to choose the mechanically-safer gear instead of the driver's particular gear selection if the transmission and/or engine protection logic determines that the driver's particular gear selection causes the mechanically-detrimental condition.

Furthermore, a method to provide a manual gear selection for a semi-manual transmission system by speech is disclosed. The method comprises steps of: selecting a manual gear selection mode for the semi-manual transmission system, activating a shift-by-speech mode by pressing a shift-by-speech on/off button and/or depressing a gear selection voice command-activating pedal, capturing a driver's voice command to select a particular gear by a microphone operatively connected to the semi-manual transmission system, comparing the driver's voice command to a plurality of known voice command profiles in a voice recognition program for a manual voice gear selection, and if the driver's voice command matches one of the plurality of known voice command profiles in the voice recognition program for the manual voice gear selection: checking whether the particular gear indicated by the driver's voice command will not result in a potential transmission or engine damage if engaged, if the particular gear indicated by the driver's voice command will not result in the potential transmission or engine damage if engaged: shifting to the particular gear in the semi-manual transmission system, if the particular gear indicated by the driver's voice command will result in the potential transmission or engine damage if engaged: shifting to a mechanically-safer gear which will not cause the potential transmission or engine damage but is closest to the particular gear indicated by the driver's command.

Moreover, a shift-by-speech transmission system is configured to select a gear indicated by a driver's voice command for a vehicle. The shift-by-speech transmission system comprises a microphone configured to pick up the driver's voice command, an on/off switch configured to enable or disable a shift-by-speech manual-shifting mode, a voice recognition program configured to analyze the driver's voice command for a driver's particular gear selection if the shift-by-speech manual-shifting mode is enabled, wherein the voice recognition program generates an output signal indicating the driver's particular gear selection if the driver's voice command is successfully understood, a shift-by-speech transmission control system containing a manual-shifting mode control logic block operatively connected to a transmission gearbox, wherein the output signal of the voice recognition program to the shift-by-speech transmission control system enables choosing the driver's particular gear selection or a mechanically-safer gear for the transmission gearbox, a transmission and/or engine protection logic operatively connected to the shift-by-speech transmission control system, wherein the transmission and/or engine protection logic is configured to determine whether the driver's particular gear selection causes a mechanically-detrimental condition to the shift-by-speech transmission system, to an engine, or to other parts of the vehicle, and an intelligent shifting algorithm logic configured to choose the mechanically-safer gear instead of the driver's particular gear selection if the transmission and engine protection logic determines that the driver's particular gear selection causes the mechanically-detrimental condition.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate automotive transmission technology. In particular, the invention provides an intuitive shift-by-speech transmission system, defined herein as "VoiceShift," to allow a driver to use voice commands to shift a semi-manual transmission to a particular gear.

For modern automobile drivers, there are three main ways to achieve a connection between a car and a driver. The first is the car's steering wheel. The steering wheel takes a driver's input to change the direction of a car. The steering wheel also provides a feedback, generally known as "road feel" to the driver by emanating texture and condition of roads and tires. The second way to achieve the connection between the car and the driver is accelerator and brake pedals. The amount of pressure applied to accelerator and brake pedals directly impact vehicle dynamics. Like the car's steering wheel, the pedals also provide some feedback related to texture and condition of roads and tires.

The third connection between the car and the driver is achieved by transmission gear shifts. Many auto enthusiasts still choose a traditional clutch pedal and stick shifter setup over conventional automatic transmissions because they feel more mechanical connection to the car with more refined driver control of the vehicle. Several transmission manufacturers and automakers came up with semi-manual transmissions with manual shift modes. These semi-manual transmissions can generally operate in automatic transmission modes unless a driver wants a manual sequential shifting. In general, there are three types of semi-manual transmissions. A first type of semi-manual transmissions is an automatic transmission with a torque converter that has simulated manual gear shift modes. These are commonly marketed as "Tiptronic", "Shiftronic", and "Steptronic" by a variety of auto manufacturers. A second type of semi-manual transmissions is an auto-clutch manual transmission capable of sequential manual gearshifts as well as simulated automatic shift modes. These are commonly marketed as Sequential Manual Gearbox (SMG) and Direct Shift Gearbox (DSG). The auto-clutch manual transmissions generally provide after gear shifts relative to the automatic transmissions with torque converters. A third type of semi-manual transmissions is a continuously variable transmission (CVT) with simulated gears. In a manual-shifting mode, the simulated gears for the CVT transmission can be selected sequentially as desired by a driver. In the United States, the CVT with simulated gears and manual shift modes are sometimes marketed as "Multitronic" transmission.

The existing semi-manual automatic transmissions are generally operated by a "tappable" gearshift lever or a paddle shifter attached to a car's steering wheel mechanism. However, many drivers feel that these semi-manual transmissions with manual sequential shifting levers s and/or paddle shifters are somewhat unnatural and remove the driver excessively from a direct man-machine engagement achieved by a clutch pedal and a stick shift.

This invention discloses a shift-by-speech transmission system called "VoiceShift" which enables a driver to choose his desired gear by saying a particular gear number (e.g. one, two, three, four, five, or six) to a microphone operatively connected to a voice recognition program. In addition, using an intelligent shifting algorithm as an optional or a standard mode, a voice command for a mechanically-detrimental gear selection is auto-corrected by a computer logic and a closest "mechanically-safe" gear shift to the driver's desired gear selection is chosen.

It is preferred that the VoiceShift system makes the gear selection with minimal time delay to maximize driver satisfaction and engagement. For instance, the processing time between a driver's spoken gear selection to the actual gear shift can be less than half a second. If the VoiceShift system is implemented with a dedicated voice library containing not much more than just a few words (e.g. names of each forward gear for the automobile's transmission), which are separate from a common voice library for temperature, radio, and telephone controls, the voice library search time for a spoken gear selection can be minimized and the matching rate between the spoken gear selection and a corresponding voice command stored in the VoiceShift system can be improved. Therefore, a preferred embodiment of the present invention uses a dedicated voice library only containing gearshift voice commands for the VoiceShift system, and vehicle voice commands unrelated to the VoiceShift system are kept in another voice library.

In one preferred embodiment (i.e. "best mode" for the invention) of the VoiceShift system, the driver first enables a manual-shift mode, which is distinct from an automatic-shift mode of a vehicle. The driver then enables the VoiceShift mode. An intelligent shifting algorithm can be built in as a standard mode or an optional mode in the VoiceShift system. If the driver's spoken gear selection is recognized by the voice recognition program as one of the transmission gears, the VoiceShift system first checks whether the spoken gear selection does not harm the vehicle's engine and transmissions (e.g. over-revving caused by an excessive skip-gear downshift). If the spoken gear selection recognized by the voice recognition system does not harm the vehicle's engine and transmissions, the VoiceShift system triggers an electro-mechanical and/or hydraulic gear selection as desired by the driver. It is preferred that the VoiceShift system makes the gear selection with minimal time delay to maximize driver satisfaction and engagement.

On the other hand, if the driver's spoken gear selection is recognized by the voice recognition program as one of the transmission gears, but the driver's spoken gear selection is determined to harm or potentially harm the vehicle's engine and transmissions, the intelligent shifting algorithm can auto-correct the driver's spoken gear selection by choosing a mechanically-safe gear shift that is closest to the driver's spoken gear selection.

The intelligent shifting algorithm for the VoiceShift system provides several advantages. First, the driver has a peace of mind even in a performance manual-shifting mode that his or her inadvertent judgment error for a gear selection by a voice command is auto-corrected by the transmission while retaining the spirit of maximum driving enjoyment and performance. A visual display can show which gear is actually selected. Second, the driver does not waste any time in the manual-shifting mode of the VoiceShift system because even if he/she issues a mechanically-detrimental gear selection voice command, the intelligent shifting algorithm auto-corrects the driver's gear selection for a rapid gear change using the closest, mechanically-safe gear selection determined by the intelligent shifting algorithm. In some situations, the intelligent shifting algorithm can reduce a delay in acceleration due to the driver's judgment error in manual non-sequential gear selection (e.g. a driver attempting a mechanically-dangerous quadruple downshift when a triple downshift was appropriate may simply receive a denial-of-command aural warning if the intelligent shifting algorithm is not used).

However, because some drivers want total control over their gear selections in a manual shifting mode, the preferred mode (i.e. best mode) of the invention is that this intelligent shifting algorithm is implemented as an optionally-selectable mode instead of a standard mode for the VoiceShift system. It should be noted that this preferred mode does not limit the scope and nature of the invention in any way.

Figure 1:
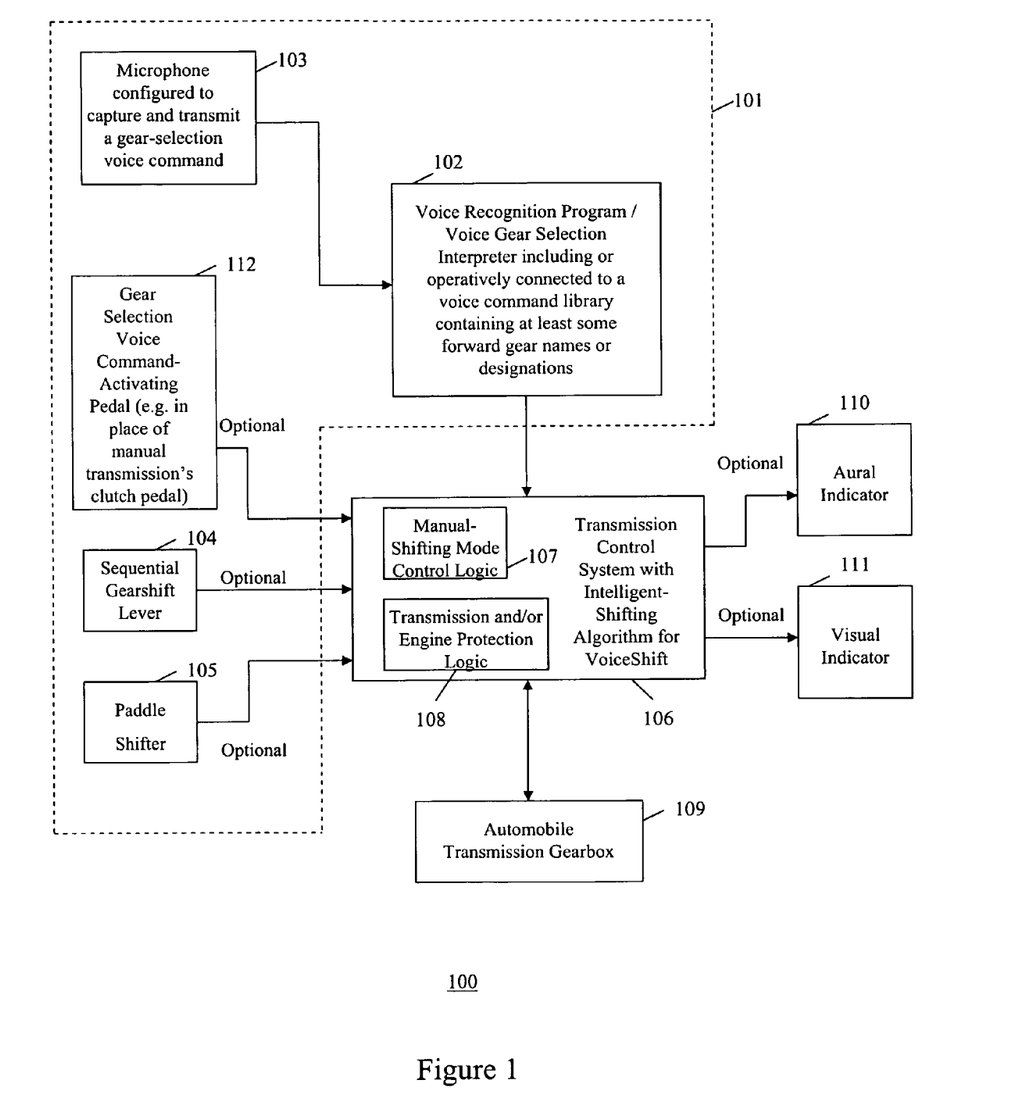
FIG. 1 shows a system-level block diagram in accordance with an embodiment of the invention.

FIG. 1 shows a system-level block diagram of one embodiment of the invention, a shift-by-speech transmission system (i.e. VoiceShift system) with intelligent shifting algorithm (100). In this particular configuration, a transmission control system with intelligent shifting algorithm (106) contains a manual-shifting mode control logic block (107). The manual-shifting mode control logic block (107) is configured to provide a manual shift mode to the driver. In one embodiment of the invention, the manual-shifting mode control logic block (107) contains a transmission and/or engine protection logic block (108). One function of the transmission and/or engine protection logic block (108) is that it prevents over-revving of an engine which could occur if the driver attempts to choose an excessively and damagingly low gear. For example, the transmission and/or engine protection logic block (108) prevents over-revving of an engine by denying a driver's voice command to downshift to a lower gear which could cause over-revving. An onboard microprocessor can calculate an acceptable threshold limit for a downshift to a lower gear. If selecting a lower gear is calculated to cause a potentially damaging situation to an engine and transmission system (e.g. a double downshift or triple downshift situations), the transmission and/or engine protection logic block (108) rejects the driver's voice command to downshift to a spoken gear number indicated by the driver's voice command. One of the key novelties and advantages of the present invention is that if the intelligent shifting algorithm in accordance with the present invention is enabled, the transmission control system with intelligent shifting algorithm (106) can choose a mechanically-safer gear selection which is closest to the spoken gear number that the driver indicated by the voice command.

In another embodiment of the invention, the transmission and/or engine protection logic block (108) can be located outside the manual-shifting mode control logic (107) and achieve a similar downshift or up-shift pre-calculation protection to the engine and transmission system in the manual-shifting mode.

Continuing with FIG. 1, the transmission control system (106) is operatively connected to a transmission gearbox (109). In one embodiment of the invention, an output signal or a plurality of output signals from the transmission control system (106) triggers an electro-mechanical and/or hydraulic gear-shifting in the transmission gearbox (109). The transmission control system (106) is also operatively connected to a voice recognition program (102). The voice recognition program (102) analyzes a voice command input from a microphone (103). In one embodiment of the invention, the voice recognition program contains a known set of voice command profiles for each gear. For example, when the microphone (103) picks up a driver's voice command gear number, "two," the voice recognition software attempts to match the driver's voice command to a known set of voice command profiles for gear shifting. In one embodiment of the invention, if the vehicle is in a VoiceShift-enabled manual-shifting mode, the driver's voice command, "two," matches with a known internal gearshift command, "Shift to Second Gear" in the voice recognition program (102). This successful voice command match in the voice recognition program (102) sends a signal to the manual-shifting mode control logic block (107) to shift to the second gear. If the transmission and/or engine protection logic block (108) determines that shifting to the second gear does not potentially harm the engine and transmission system, the transmission control system (106) sends a signal to the transmission gearbox (109) to shift to the second gear. In one preferred mode of embodiment, the time delay between a driver's voice command for a gear shift to an actual electro-mechanical engagement of a new gear is minimal, often less than one second.

Continuing with FIG. 1, the VoiceShift system optionally also has conventional means to shift gears in a manual-shifting mode. One conventional way to shift gears is a sequential gearshift lever (104), which can be tapped sideways or up-and-down for up-shifts or downshifts. Another conventional way to shift gears is a paddle shifter or a plurality of paddle shifters (105), which can be pushed, pulled, or pressed to initiate up-shifts or downshifts. In one embodiment of the invention, the VoiceShift system for taking driver's gear-shift commands by voice can be activated in two-steps. A first step can be sliding the semi-manual transmission gear to a manual-shifting mode, commonly called the "M-mode" which is typically distinct from an automatic-mode (e.g. "D-Mode") of the semi-manual transmission. In the M-mode, a vehicle may take input from the paddle shifters (105) or the sequential gearshift lever (104) for manual gear shifting. A second step is pressing a separate "VoiceShift on/off" button to switch the VoiceShift system on, at which point the VoiceShift system can actively take driver's voice commands for manual gear shifting. Although this invention is not limited to such two-step processes to activate the VoiceShift system, there are some advantages to such two-step processes.

One advantage of the two-step processes to activate the VoiceShift mode is minimizing the driver's user-interface error. It could be an annoyance or a safety hazard to the driver if the VoiceShift system is inadvertently active simply because the transmission gearshift lever is accidentally set in a wrong transmission gate. (i.e. transmission shifter accidentally sliding into the "M-mode" gate). Furthermore, the VoiceShift system may not accurately pick up a driver's voice command for gear-shifting if a car audio is active. In one embodiment of the invention, a separate button to enable the VoiceShift system allows the car audio to "fade-out" quietly while car speakers announce "VoiceShift system on". Disabling the VoiceShift system by pressing the button again can trigger the car speakers to announce "VoiceShift system off" and fade-in music that was previously faded-out by enabling the VoiceShift system. While these two-step processes do not limit the scope, claims, or extent of the invention in any way, it is hereby noted that the two-step processes is a preferred mode (i.e. best mode) for the invention.

Continuing with FIG. 1, in one embodiment of the invention, the shift-by-speech transmission system with intelligent shifting algorithm (100) is configured to operate with a gear selection voice command-activating pedal (112), which can be placed as an electronically-activated pedal next to a brake pedal (e.g. in place of where a clutch pedal is in a manual transmission vehicle). In one example of this embodiment, when the gear selection voice command-activating pedal (112) is depressed by a driver's left foot, the shift-by-speech transmission system (100) opens a window of time to take a driver's manual gear selection voice command for a rapid and safe processing of a desired gearshift. If the gear selection voice command-activating pedal (112) is no longer depressed by the driver's left foot, the shift-by-speech transmission system (100) disables input from the microphone (103) until the voice command-activating pedal (112) is depressed again. This vehicle-to-driver interface using the gear selection voice command-activating pedal (112) is very similar to an interaction between a driver and a clutch pedal in a manual transmission vehicle, which is significantly more intuitive and exciting than conventional sequential manual gear selection interfaces for semi-manual transmissions. In one preferred embodiment of the present invention, the shift-by-speech transmission system with intelligent shifting algorithm (100) has a front-end interface (101) comprising the microphone (103), the voice recognition program (102), the gear selection voice command-activating pedal (112), the sequential gearshift lever (104), and the paddle shifter (105).

The shift-by-speech transmission system with intelligent shifting algorithm (100) can optionally have an aural indicator (110) and a visual indicator (111) operatively connected to the transmission control system (106). In one embodiment of the invention, the aural indicator (110) is operatively connected to a vehicle's audio speakers and the visual indicator (111) is operatively connected to a vehicle's instrument panel. In another embodiment of the invention, the aural indicator (110) has its own speaker.

In one example, the aural indicator (110) is configured to generate a confirmatory sound (e.g. one short "beep") if a successful voice-command gear shifting occurs in a manual-shifting mode. In the same example, the aural indicator (110) is also configured to generate a denial-of-shift sound (e.g. one "beep-beep") if the voice command is not understood or a gear-shifting cannot occur for any other reasons (e.g. over-revving if a driver's desired gear were to be engaged).

Figure 2:
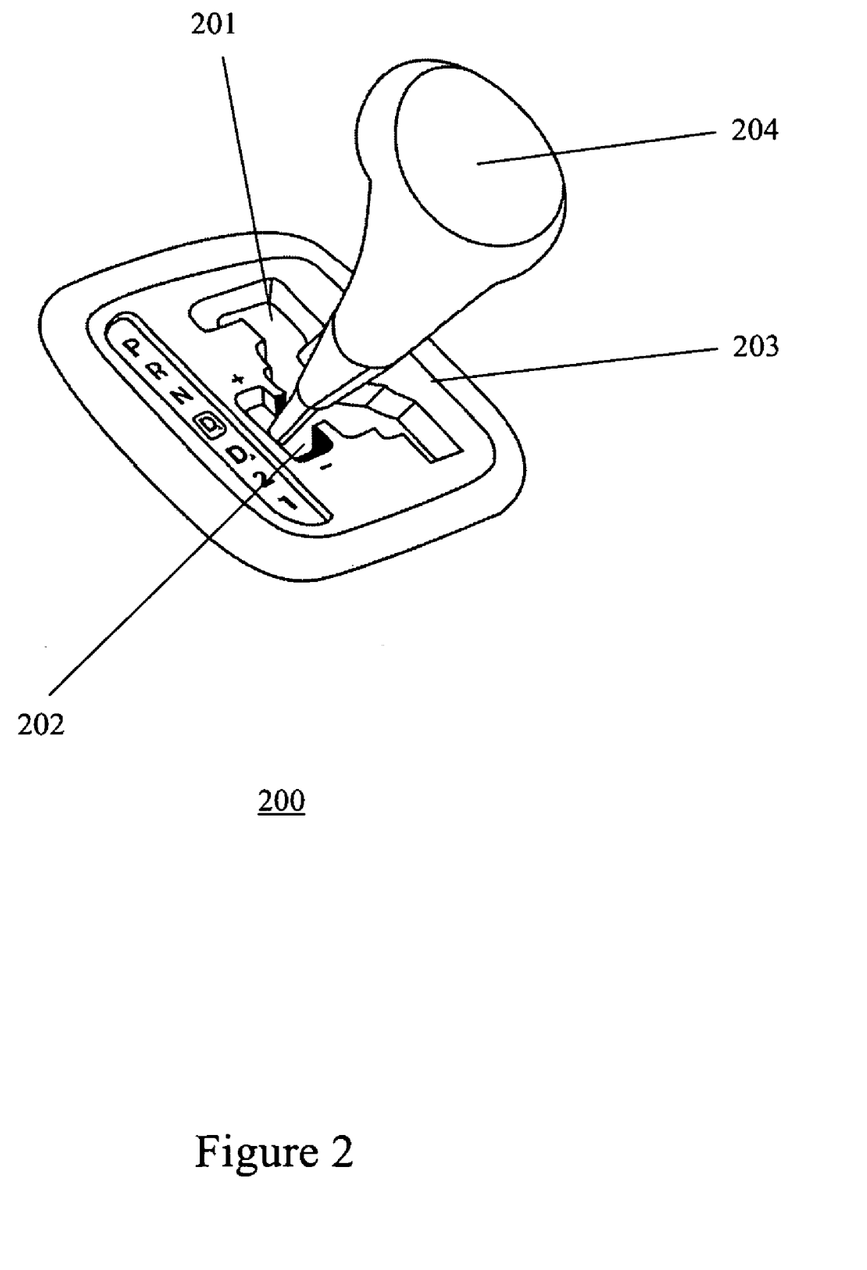
FIG. 2 shows a semi-manual gear shifter in accordance with an embodiment of the invention.

FIG. 2 is a transmission gate configuration (201) in accordance with one embodiment (200) of the invention. In general, this transmission gate configuration (201) is a standard setup in many semi-manual transmission vehicles, other than for geometrical differences (i.e. manual-mode shifting gate, or "M"-gate could be on the left, right, or bottom of other transmission gates). Typically, if a transmission gearshift lever (204) is in the M-gate (202) of a semi-manual transmission interface (203), the vehicle's transmission is in a manual-shifting mode. In this particular configuration as shown in FIG. 2, tapping the transmission gearshift lever (204) upward to "+" direction results in a sequential up-shift. Tapping the transmission gearshift lever (204) downward to "−" direction results in a sequential downshift. It should be noted that one major advantage of the VoiceShift system, which can be implemented either independently or in conjunction with the existing manual-shifting setup as shown in FIG. 2, is its freedom to double downshift or even triple or quadruple-downshift, if the transmission system's rev-limiter or engine/transmission protection logic determines that such downshifts are not potentially mechanically-detrimental to the engine and/or transmission system. In one embodiment of the invention, the rev-limiter logic is typically incorporated in the transmission and/or engine protection logic block (108) of FIG. 1.

Likewise, the VoiceShift system also enables a double, triple, or quadruple up-shifts if the transmission system determines that such skip shifts are not damaging to the engine and transmission system. The driver's freedom and flexibility gained by the VoiceShift system is significant. Instead of being confined by sequential manual shifts, the driver is able to skip-shift as he or she is able to do in a traditional manual transmission system with a clutch pedal. Furthermore, the VoiceShift system enables a safer and more engaged driving experience by reducing driver distraction caused by somewhat unnatural motion of tapping transmission shifters or paddle shifters.

Figure 3:
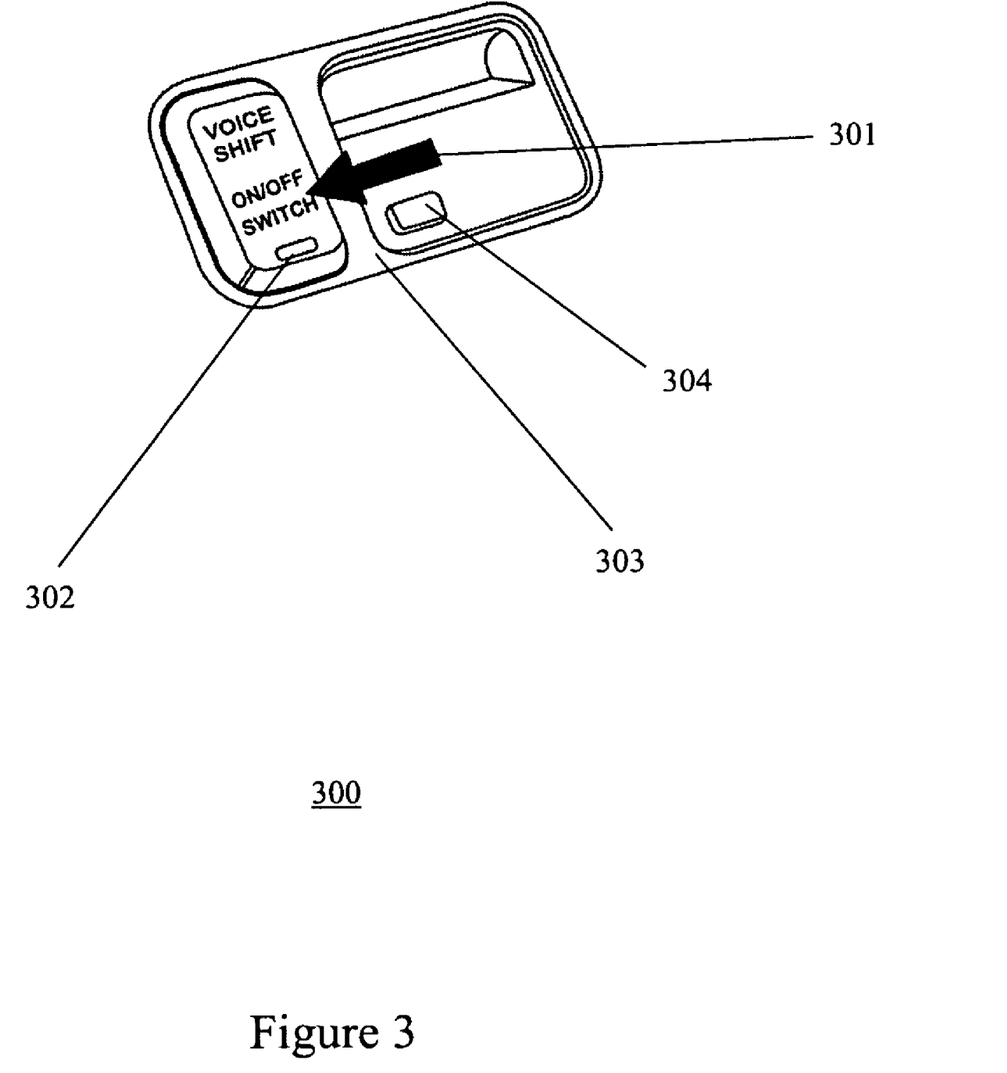
FIG. 3 shows a VoiceShift on/off switch on a dashboard, a transmission box, or a steering wheel in accordance with an embodiment of the invention.

FIG. 3 is a VoiceShift on/off switch (301) in accordance with one VoiceShift switch configuration (300). In FIG. 3, the VoiceShift on/off switch (301) is pointed by a thick black arrow for illustration purposes. In this example, the VoiceShift on/off switch (301) has a light indicator (302) to inform the driver whether the VoiceShift system is on or off. In one embodiment of the invention, an intelligent shifting algorithm on/off switch (304) can enable or disable the intelligent shifting algorithm used with the VoiceShift system. The VoiceShift switch configuration (300) can be used as part of the two step processes previously described for FIG. 1 for activating the VoiceShift system. The VoiceShift on/off switch (301) could be located on a car dashboard (303), a center stack, a steering wheel, or any other desired locations in a car equipped with the VoiceShift system. It is noted that VoiceShift on/off switch (301) is merely optional to the VoiceShift system and does not limit scope or claims of the invention.

Figure 4:
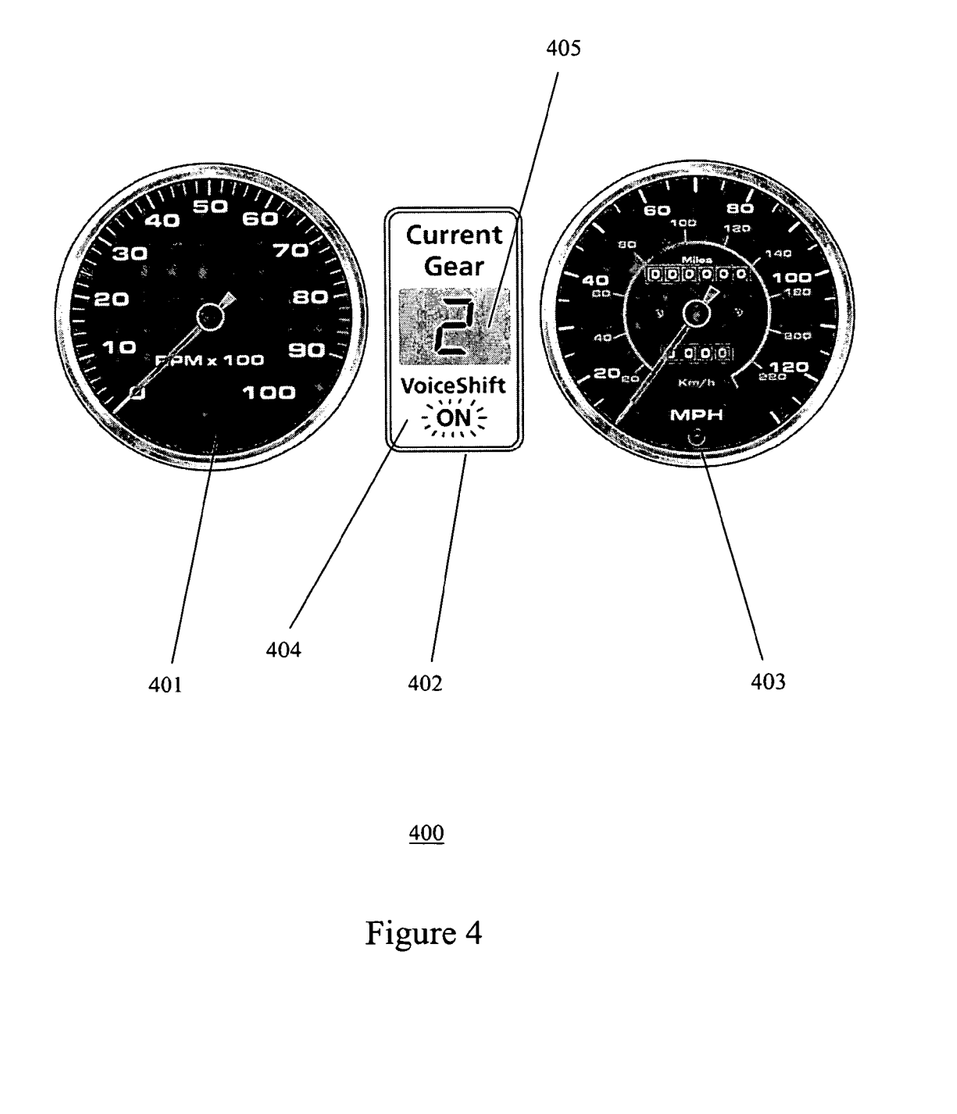
FIG. 4 shows a VoiceShift-enabled instrument panel with a visual gear selection indicator in accordance with an embodiment of the invention.

FIG. 4 shows a car dashboard (400) with a VoiceShift system visual indicator (402) in accordance with an embodiment of the invention. In one embodiment of the invention, if the VoiceShift System is enabled, "VoiceShift On" message (404) appears in the VoiceShift system visual indicator (402). The VoiceShift system visual indicator (402) shows a current gear selection (405) (e.g. Second-gear indicated as "2") and whether the VoiceShift system is "on". The VoiceShift system indicator (402) can be part of an LCD screen or a separate lighted indicator, which is typically located in the car dashboard (400). The car dashboard also typically contains a tachometer (401) and a speedometer (403).

Figure 5:
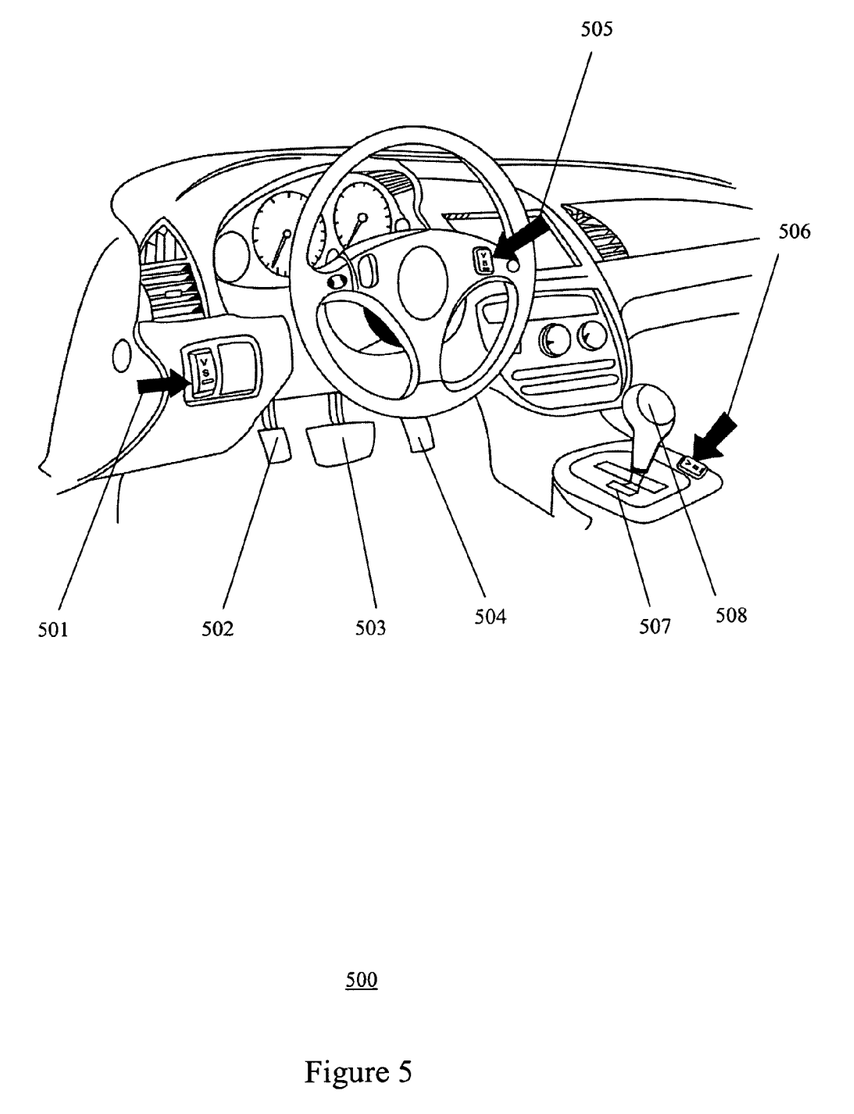
FIG. 5 shows a VoiceShift-capable operating environment with a dedicated VoiceShift activation pedal and one or more VoiceShift-enabling switches in accordance with an embodiment of the invention.

FIG. 5 shows a VoiceShift-capable operating environment (500) with a dedicated VoiceShift activation pedal (502), a gearshift lever (508), a manual-shifting mode gate (507), and one or more VoiceShift on/off switches (501, 505, 506) pointed by thick black arrows for the purpose of illustration, in accordance with an embodiment of the invention. In this particular example as shown in FIG. 5, the dedicated VoiceShift activation pedal (502) is one type of the "gear selection voice command-activating pedal" (112) previously described in FIG. 1. In a preferred embodiment of the invention, the dedicated VoiceShift activation pedal (502) is next to a brake pedal (503) and an accelerator pedal (504).

In one embodiment of the invention, the VoiceShift-capable operating environment (500) is equipped with the dedicated VoiceShift activation pedal (502) which can be placed as an electronically-activated pedal next to a brake pedal (e.g. in place of where a clutch pedal is in a manual transmission vehicle). An electronically-activated pedal is defined as a pedal activated or deactivated by depression or release of the pedal, typically acting as an electrical on/off switch. Although an electronically-activated pedal is a preferred embodiment of the invention for the dedicated VoiceShift activation pedal (502), hydraulic, mechanical, or other types of pedals can be used for the dedicated VoiceShift activation pedal (502).

Continuing with FIG. 5, in one embodiment of the VoiceShift-capable operating environment (500), when a VoiceShift system is switched to an "on" mode and the dedicated VoiceShift activation pedal (502) is depressed by a driver's left foot, the VoiceShift system operatively connected to the dedicated VoiceShift activation pedal (502) opens a window of time for a microphone to take a driver's manual gear selection voice command for a rapid and safe processing of the driver's manual gear selection voice command. If the dedicated VoiceShift activation pedal (502) is no longer depressed by the driver's left foot, the VoiceShift system disables input from the microphone until the dedicated VoiceShift activation pedal (502) is depressed again. This vehicle-to-driver interface using the dedicated VoiceShift activation pedal (502) simulates the interaction between a driver and a clutch pedal in a manual transmission vehicle. Therefore, the present invention, as shown by the VoiceShift-capable operating environment (500) of FIG. 5, is significantly more intuitive and exciting than conventional sequential manual gear selection interfaces.

The implementation of VoiceShift on/off switches (501, 505, 506) in FIG. 5 is optional. If one or more VoiceShift on/off switches are designed into the VoiceShift-capable operating environment (500), then only one VoiceShift on/off switch or any combination of these VoiceShift on/off switches (501, 505, 506) may be implemented in the VoiceShift-capable operating environment (500) according to a preference of an automotive interior design team. Furthermore, an additional switch may be located in place of one of the VoiceShift on/off switches (501, 505, 506) to turn intelligent shifting algorithm on or off. In one preferred embodiment of the present invention, the dedicated VoiceShift activation pedal (502) is functionally active only when the VoiceShift system is switched to an "on" mode by at least one of the VoiceShift on/off switches (501, 505, 506). Therefore, in the same preferred embodiment of the present invention, if the VoiceShift system is in an "off" mode, the dedicated VoiceShift activation pedal (502) is also functionally disabled, whether the VoiceShift activation pedal (502) is depressed or released by the driver. This preferred embodiment with one or more VoiceShift on/off switches (501, 505, 506) and the dedicated VoiceShift activation pedal (502), which operates only when the VoiceShift is in the "on" mode, provides an additional level of safety against accidental operation of the driver's manual gear selection voice command.

Furthermore, even more level of safety may be added to prevent accidental operation of the driver's manual gear selection voice command by requiring the driver to place the gearshift lever (508) to the manual-shifting mode gate (507) (i.e. "M" transmission gate) from an automatic drive mode (i.e. "D" transmission gate) to activate the VoiceShift system. By providing a three-level of protection from an accidental operation of the driver's manual gear selection voice command, (i.e. a position of the gearshift lever to be placed in the "M" gate, a VoiceShift on/off switch to be switched "on", and a VoiceShift activation pedal (502) to be depressed to activate a microphone for voice command input to the VoiceShift system), the driver's chance of accidental operation of VoiceShift is minimized.

Continuing with FIG. 5, when the VoiceShift is switched to the "on" mode by one of the VoiceShift on/off switches (501, 505, 506) and/or when the VoiceShift activation pedal (502) is depressed by the driver's left foot, a vehicle's audio system can be automatically muted for accurate reception of the driver's manual gear selection voice command. In one embodiment of the invention, each VoiceShift on/off switch (501, 505, 506) in FIG. 5 is functionally similar to the VoiceShift on/off switch (301) of FIG. 3.

Figure 6:
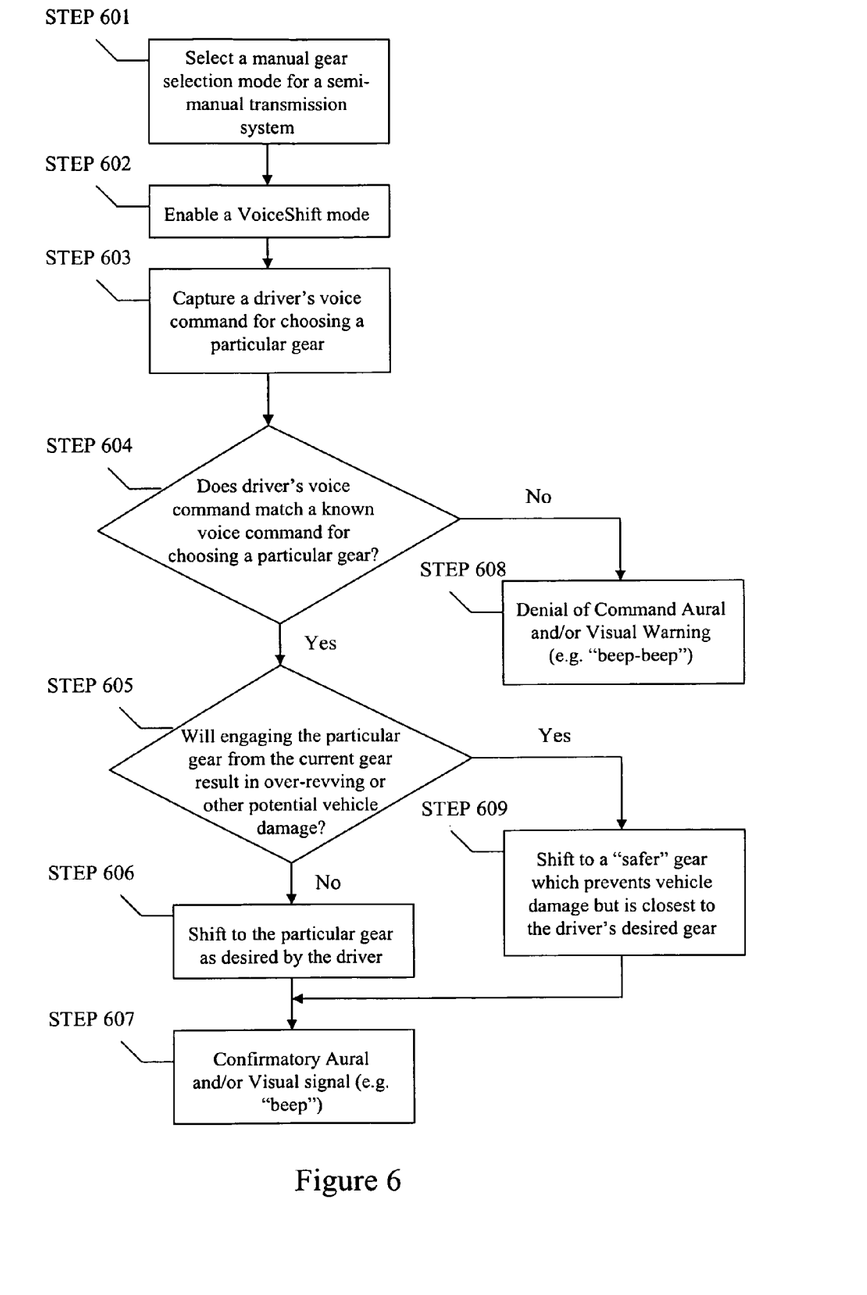
FIG. 6 shows a flowchart of VoiceShift with an intelligent shifting algorithm in accordance with an embodiment of the invention.

FIG. 6 shows a flowchart for the VoiceShift system with intelligent shifting algorithm in an enabled mode in accordance with one embodiment of the invention. In STEP 601, a driver activates a manual gear selection mode (e.g. "M" gate or "M-mode" from transmission gates). In one embodiment of the invention, the manual gear selection mode also enables a "tappable" gear shifter or paddle shifters for manual gear selection. In STEP 602, a VoiceShift mode is enabled after the manual gear selection mode is activated from STEP 601. In one embodiment, STEP 601 and STEP 602 can be combined as one procedure. It could be as simple as putting the gear shifter in the "M" gate. In another embodiment, STEP 602 is a discrete step. For example, the VoiceShift mode can be enabled by pushing a separate button on a center stack or a dashboard. The advantages of such two-step processes are previously described for FIG. 1.

Continuing with FIG. 6, in STEP 603, a microphone operatively connected to the VoiceShift system captures a driver's voice command for choosing a particular gear. In STEP 604, a voice recognition program for the VoiceShift system determines whether the driver's voice command matches a known voice command for choosing the particular gear. If the voice recognition program does not understand the driver's voice command or does not find an appropriate match from a library of known voice commands, the VoiceShift system may send a denial-of-command aural warning, which could be as simple as a "beep-beep", as shown in STEP 608. If the driver's voice command matches a known voice command for choosing the particular gear, then in STEP 605, an engine and/or transmission protection logic, which may have also incorporated a rev-limit logic, calculates and determines whether engaging the particular gear desired by the driver will result in over-revving or any other potential harm to an engine/transmission system or other parts of the vehicle.

If the engine and/or transmission protection logic determines that engaging the particular gear does not cause any harm to the engine/transmission system or other parts of the vehicle in STEP 605, then in STEP 606, the VoiceShift-enabled transmission system triggers a physical gearshift to the particular gear, as instructed by the driver using a voice command. Then, in STEP 607, the VoiceShift system generates a confirmatory aural signal indicating a gearshift, which could be as simple as one short "beep".

On the other hand, if the engine and/or transmission protection logic determines that engaging the particular gear is harmful to the engine/transmission system or other parts of the vehicle in STEP 605, then in STEP 609, the transmission system control of the VoiceShift system uses an intelligent shifting algorithm to shift to a mechanically-safer gear that is closest to the driver's particular gear given by the voice command. Then, in STEP 607, the VoiceShift system generates a same or different confirmatory aural signal indicating a gearshift (e.g. one short "beep").

Figure 7:
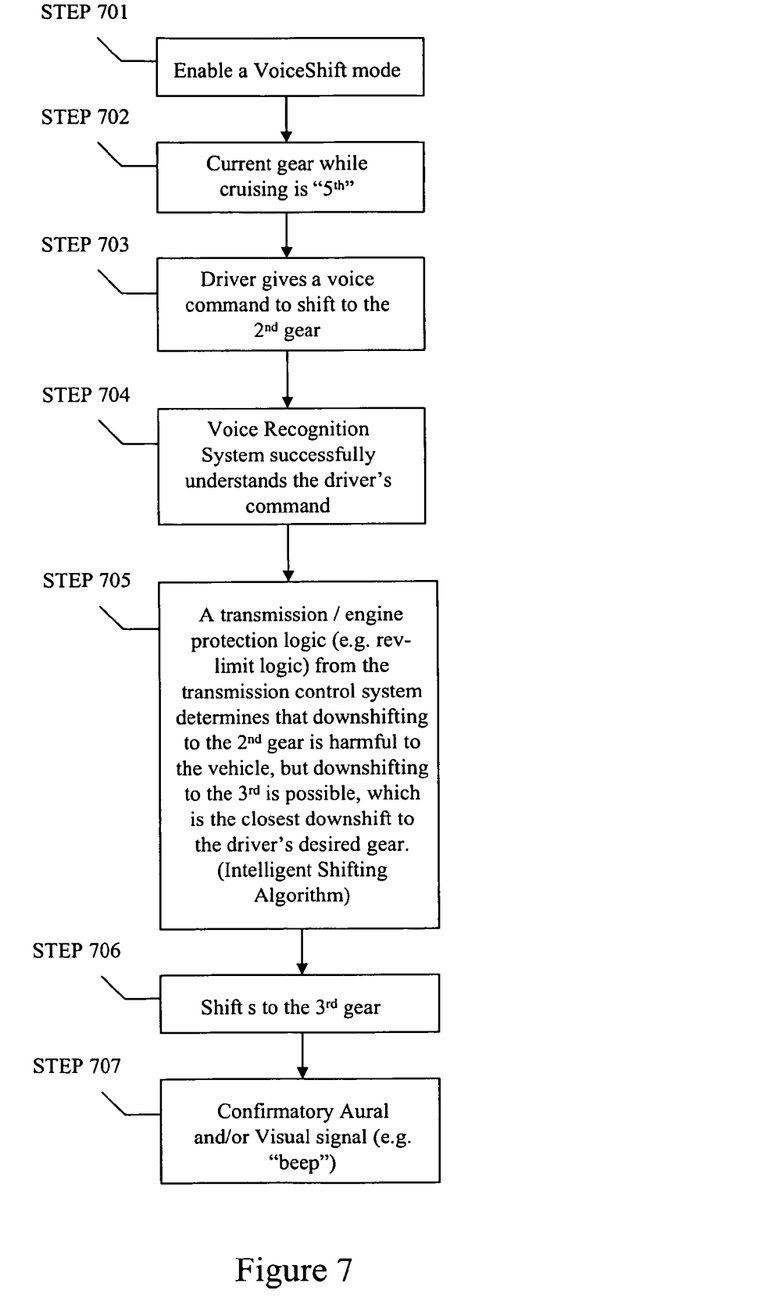
FIG. 7 shows a flowchart of the intelligent shifting algorithm for downshifting in accordance with an embodiment of the invention.

FIG. 7 shows an example of using the intelligent shifting algorithm for the VoiceShift system during a downshift in accordance with an embodiment of the present invention. In STEP 701, a driver enables a VoiceShift mode. In STEP 702, the current gear for the VoiceShift-equipped transmission system is the fifth gear. In STEP 703, the driver issues a voice command to the VoiceShift-equipped transmission to shift to the second gear. The voice recognition program of the VoiceShift system successfully understands the driver's command in STEP 704. Then, in STEP 705, a transmission and/or engine protection logic from the transmission control system, which may optionally incorporate a rev-limit logic, determines that downshifting to the second gear is mechanically harmful to the vehicle. However, the intelligent shifting algorithm, based on a microprocessor calculation of all mechanically-safe possible gears, determines that downshifting to the third gear is possible and mechanically-safe, which is the closest and mechanically-safe downshift to the driver's desired gear. Because the intelligent shifting algorithm is currently in an enabled mode, in STEP 706, the VoiceShift transmission system downshifts to the third gear. Then, in STEP 707, a confirmatory aural and/or visual signal is issued to inform the driver of a gear change.

Figure 8:
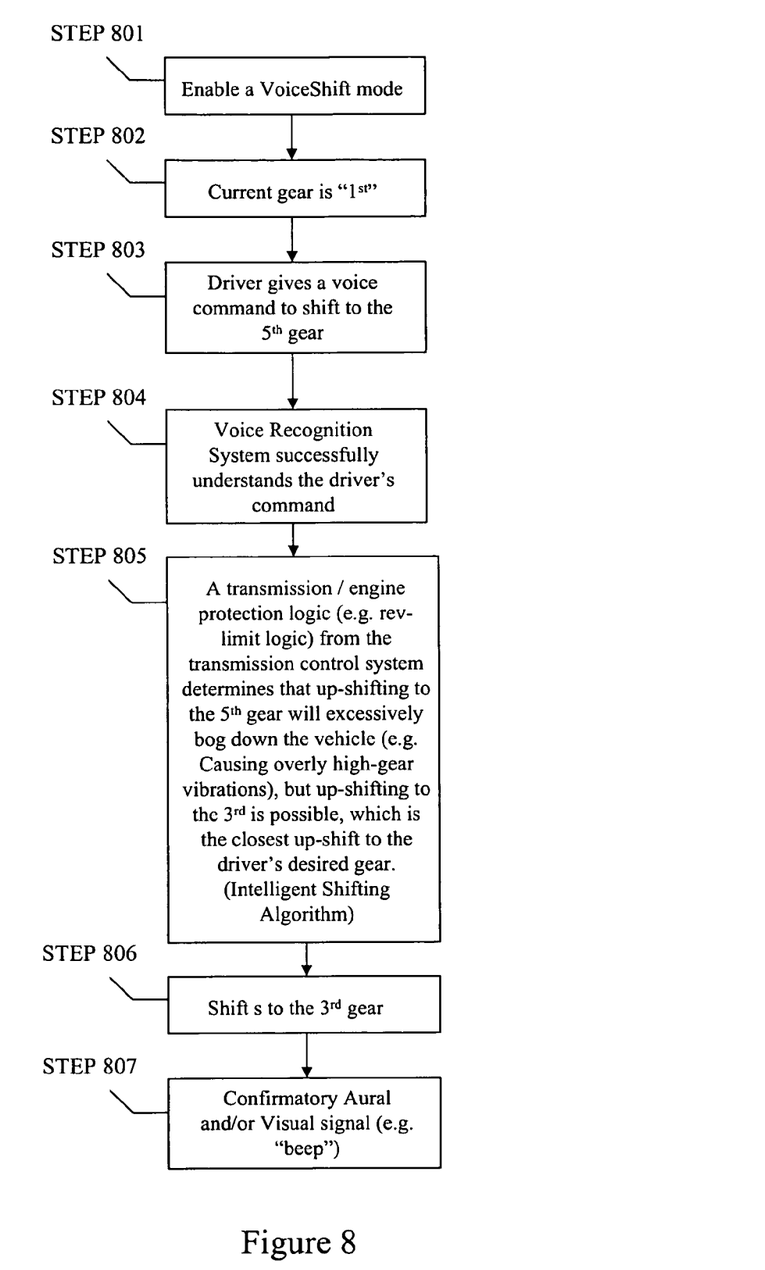
FIG. 8 shows a flowchart of the intelligent shifting algorithm for up-shifting in accordance with an embodiment of the invention.

FIG. 8 shows an example of using the intelligent shifting algorithm for the VoiceShift system during an up-shift in accordance with an embodiment of the present invention. In STEP 801, a driver enables a VoiceShift mode. In STEP 802, the current gear for the VoiceShift-equipped transmission system is the first gear. In STEP 803, the driver issues a voice command to shift to the fifth gear. The voice recognition program of the VoiceShift system successfully understands the driver's command in STEP 804. Then, in STEP 805, a transmission and/or engine protection logic from the transmission control system determines that up-shifting to the fifth gear is mechanically harmful to the vehicle, potentially bogging down the vehicle and causing excessive high-gear vibrations at relatively low vehicle speeds. However, the intelligent shifting algorithm, based on a microprocessor calculation of all mechanically-safe possible gears, determines that up-shifting to the third gear is possible and mechanically-safe, which is the closest and mechanically-safe up-shift to the driver's desired gear (i.e. the fifth gear). Because the intelligent shifting algorithm is currently in an enabled mode, in STEP 806, the VoiceShift transmission system up-shifts to the third gear. Then, in STEP 807, a confirmatory aural and/or visual signal is issued to inform the driver of a gear change.

If the intelligent shifting algorithm is in a disabled mode, then in one embodiment of the present invention, the VoiceShift transmission system can simply generate a denial-of-command aural and/or visual warning (e.g. a short "beep-beep" sound).

In a preferred mode of embodiment, intelligent shifting algorithms disclosed in this invention only takes a fraction of a second to execute. Ideally, the physical gear change triggered by a voice command (i.e. a shift to a particular gear indicated by the driver or a shift to the closest "mechanically-safe" gear based on the intelligent shifting algorithms) should be designed to take only a small amount of time for optimal driving engagement. However, the actual delay and reaction time between a voice command for a gear change and a physical corresponding gear change does not limit the scope, claims, or extent of the invention.

The present invention, which discloses an intelligent shifting algorithm for a semi-manual transmission system (interchangeably called the VoiceShift system in this patent literature) provides several advantages. First, the driver has a peace of mind even in a performance manual-shifting mode that his or her inadvertent judgment error for a gear selection by a voice command is auto-corrected by the transmission while retaining the spirit of maximum driving enjoyment, acceleration, and performance. A visual display can show which gear is actually selected. Second, the driver does not waste any time in the manual-shifting mode of the VoiceShift system, when the intelligent shifting algorithm is used, because even if he/she issues a mechanically-detrimental gear selection voice command, the intelligent shifting algorithm auto-corrects the driver's gear selection for a rapid gear change using the closest, mechanically-safe gear selection determined by the intelligent shifting algorithm. However, because some drivers want total control over their gear selections in a manual shifting mode, the preferred mode (i.e. best mode) of the invention is that this intelligent shifting algorithm is implemented as an optionally-selectable mode. It should be noted that this preferred mode does not limit the scope and nature of the invention in any way.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A shift-by-speech transmission system configured to select a gear indicated by a driver's voice command for a vehicle, the shift-by-speech transmission system comprising:
    a microphone configured to pick up the driver's voice command;
    a voice recognition program configured to analyze the driver's voice command for a driver's particular gear selection, wherein the voice recognition program generates an output signal indicating the driver's particular gear selection if the driver's voice command is successfully understood;
    a shift-by-speech transmission control system containing a manual-shifting mode control logic block operatively connected to a transmission gearbox, wherein the output signal of the voice recognition program to the shift-by-speech transmission control system enables choosing the driver's particular gear selection or a mechanically-safer gear for the transmission gearbox;
    a transmission and/or engine protection logic operatively connected to the shift-by-speech transmission control system, wherein the transmission and engine protection logic is configured to determine whether the driver's particular gear selection causes a mechanically-detrimental condition to the shift-by-speech transmission system, to an engine, or to other parts of the vehicle; and
    an intelligent shifting algorithm logic configured to choose the mechanically-safer gear instead of the driver's particular gear selection if the transmission and/or engine protection logic determines that the driver's particular gear selection causes the mechanically-detrimental condition.

2. The shift-by-speech transmission system of claim 1, wherein the intelligent shifting algorithm logic is further configured to define the mechanically-safer gear as a transmission gear which is closest to the driver's particular gear selection but does not cause potential mechanical damage to the shift-by-speech transmission system, to the engine, or to the other parts of the vehicle.

3. The shift-by-speech transmission system of claim 1, further comprising an aural indicator logic block, wherein the aural indicator logic block is configured to generate a first confirmatory success aural signal if the driver's particular gear selection is successful, a second confirmatory success aural signal if the intelligent logic chooses and engages the mechanically-safer gear defined by the intelligent shifting algorithm logic, or a warning aural signal if the driver's particular gear selection is not recognized and/or no new gear is engaged.

4. The shift-by-speech transmission system of claim 3, wherein the first confirmatory success aural signal is a first distinct sound.

5. The shift-by-speech transmission system of claim 3, wherein the second confirmatory success aural signal is a second distinct sound.

6. The shift-by-speech transmission system of claim 3, wherein the warning aural signal if the driver's particular gear is not recognized and/or no new gear is engaged is a third distinct sound.

7. The shift-by-speech transmission system of claim 1, further comprising a display unit indicating a current gear selection.

8. The shift-by-speech transmission system of claim 1, further comprising a shift-by-speech on/off switch to enable or disable a manual gear selection by the driver's command.

9. The shift-by-speech transmission system of claim 1, further comprising a selection mode to turn the intelligent shifting algorithm logic on or off for the shift-by-speech transmission system.

10. The shift-by-speech transmission system of claim 1, further comprising a gear selection voice command-activating pedal configured to enable the microphone only when the gear selection voice command-activating pedal is depressed with a driver's foot.

11. The shift-by-speech transmission system of claim 1, wherein the driver's particular gear selection is a simulated gear implemented by a continuously variable transmission (CVT).

12. A method to provide a manual gear selection for a semi-manual transmission system by speech, the method comprising:
    selecting a manual gear selection mode for the semi-manual transmission system;
    activating a shift-by-speech mode by pressing a shift-by-speech on/off button and/or depressing a gear selection voice command-activating pedal
    capturing a driver's voice command to select a particular gear by a microphone operatively connected to the semi-manual transmission system;
    comparing the driver's voice command to a plurality of known voice command profiles in a voice recognition program for a manual voice gear selection; and
    if the driver's voice command matches one of the plurality of known voice command profiles in the voice recognition program for the manual voice gear selection:
        checking whether the particular gear indicated by the driver's voice command will not result in a potential transmission or engine damage if engaged;
        if the particular gear indicated by the driver's voice command will not result in the potential transmission or engine damage if engaged:
            shifting to the particular gear in the semi-manual transmission system;
        if the particular gear indicated by the driver's voice command will result in the potential transmission or engine damage if engaged:
            shifting to a mechanically-safer gear which will not cause the potential transmission or engine damage but is closest to the particular gear indicated by the driver's command.

13. The method of claim 12, further comprising the steps of generating a first aural confirmation if the particular gear indicated by the driver's voice command is successfully engaged or a second aural confirmation if the mechanically-safer gear is engaged.

14. The method of claim 12, further comprising the steps of generating an aural warning if the particular gear indicated by the driver's voice command is not recognized and/or no new gear is engaged.

15. The method of claim 12, further comprising the steps of generating a visual sign to indicate a current gear selection.

16. A shift-by-speech transmission system configured to select a gear indicated by a driver's voice command for a vehicle, the shift-by-speech transmission system comprising:
    a microphone configured to pick up the driver's voice command;
    an on/off switch configured to enable or disable a shift-by-speech manual-shifting mode;
    a voice recognition program configured to analyze the driver's voice command for a driver's particular gear selection if the shift-by-speech manual-shifting mode is enabled, wherein the voice recognition program generates an output signal indicating the driver's particular gear selection if the driver's voice command is successfully understood;

a shift-by-speech transmission control system containing a manual-shifting mode control logic block operatively connected to a transmission gearbox, wherein the output signal of the voice recognition program to the shift-by-speech transmission control system enables choosing the driver's particular gear selection or a mechanically-safer gear for the transmission gearbox;

a transmission and/or engine protection logic operatively connected to the shift-by-speech transmission control system, wherein the transmission and/or engine protection logic is configured to determine whether the driver's particular gear selection causes a mechanically-detrimental condition to the shift-by-speech transmission system, to an engine, or to other parts of the vehicle; and an intelligent shifting algorithm logic configured to choose the mechanically-safer gear instead of the driver's particular gear selection if the transmission and engine protection logic determines that the driver's particular gear selection causes the mechanically-detrimental condition.

17. The shift-by-speech transmission system of claim 16, wherein the intelligent shifting algorithm logic is further configured to define the mechanically-safer gear as a transmission gear which is closest to the driver's particular gear selection but does not cause potential mechanical damage to the shift-by-speech transmission system, to the engine, or to the other parts of the vehicle.

18. The shift-by-speech transmission system of claim 16, further comprising a semi-manual gearshift lever with a manual shift mode, and/or a paddle-shifter attached to a steering wheel unit for manual sequential shifting.

19. The shift-by-speech transmission system of claim 16, further comprising an aural indicator logic block, wherein the aural indicator logic block is configured to generate a first confirmatory success aural signal if the driver's particular gear selection is successful, a second confirmatory success aural signal if the safer gear is chosen and engaged, or a warning aural signal if the driver's particular gear selection is unrecognized and/or no new gear is engaged.

20. The shift-by-speech transmission system of claim 16, wherein the driver's particular gear selection is a simulated gear implemented by a continuously variable transmission (CVT).

\* \* \* \* \*